JAMES BELL, OF SONORA, CALIFORNIA.

Letters Patent No. 86,898, dated February 16, 1869.

IMPROVED WASHING-FLUID

The Schedule referred to in these Letters Patent and making part of the same.

*To all whom it may concern:*

Be it known that I, JAMES BELL, of Sonora, county of Tuolumne, State of California, have invented an Improved Washing-Fluid; and I do hereby declare that the following is a true repetition of the ingredients used in making said fluid, together with the manner of compounding and mixing the same, and the directions for using when made.

To make my washing-fluid, I employ the following ingredients, in the proportions specified, to wit:

One (1) ounce Chili bark or Spanish soap; one (1) pound soda-ash; one-quarter ($\frac{1}{4}$) pound lime; one-half ($\frac{1}{2}$) ounce borax; one-half ($\frac{1}{2}$) ounce spirits of turpentine; one (1) gallon water.

The Chili bark is first placed in a quart of water, which is placed over a fire, and allowed to boil five minutes. The soda-ash, lime, and borax, are then mixed together in three quarts of cold water, and placed over a fire, where the mixture is allowed to heat gradually until it comes to a boil. After boiling about fifteen minutes, the first mixture of Chili bark and water is poured into it, when the whole is allowed to boil for five minutes, after which it is set away to cool. When cool, the liquor is drawn off, and the turpentine added, when it is bottled and set away for use.

One and a half gill of the fluid will be sufficient to soften ten gallons of water, in which the clothes should be soaked from one to six hours, or over night, if more convenient. Then boil them, in the same water, with a small quantity of soap, for fifteen minutes, when, by a slight rubbing, the clothes will be found perfectly clean, and they may be rinsed and hung to dry without again boiling.

It will not injure the texture of the most delicate fabrics, is especially excellent for woollen goods, and will not disturb their colors. The washing can be done with one-third the usual quantity of soap, thereby saving more than twice the cost of the fluid, and with great saving of labor and wear of fabric.

A few drops used in water for bathing, has a most beneficial effect on the skin, making it soft and smooth, and removing all discolorations.

It is unsurpassed in its cleansing-properties for the scalp and hair.

It is also an excellent agent for removing stains and grease-spots from clothing and wood, for cleaning paint, crockery, and glass, and for imparting a fine polish to silver-ware and tin utensils.

The bottles in which the fluid is kept should always be tightly corked, and it should be well shaken before using.

Having thus described my invention,

What I claim, and desire to secure by Letters Patent, is—

The above-described composition for washing-fluid, made of the ingredients enumerated, mixed or compounded in about the proportions specified.

In witness whereof, I have hereunto set my hand and seal.

JAMES BELL. [L. S.]

Witnesses:
  WM. G. LONG,
  L. E. NELSON.